United States Patent

Hu

(10) Patent No.: US 8,406,017 B2
(45) Date of Patent: Mar. 26, 2013

(54) RESONANT INVERTER

(75) Inventor: Aiguo Hu, Auckland (NZ)

(73) Assignee: Auckland Uniservices Limited, Auckland (NZ)

( * ) Notice: Subject to any disclaimer, the term of this patent is extended or adjusted under 35 U.S.C. 154(b) by 1036 days.

(21) Appl. No.: 11/997,659

(22) PCT Filed: Aug. 3, 2006

(86) PCT No.: PCT/NZ2006/000201
§ 371 (c)(1), (2), (4) Date: Jun. 11, 2008

(87) PCT Pub. No.: WO2007/015651
PCT Pub. Date: Feb. 8, 2007

(65) Prior Publication Data
US 2008/0247210 A1    Oct. 9, 2008

(30) Foreign Application Priority Data
Aug. 3, 2005 (NZ) ........................ 541629

(51) Int. Cl.
*H02M 3/335* (2006.01)
*H02M 7/538* (2007.01)

(52) U.S. Cl. ............... 363/22; 363/97; 363/133

(58) Field of Classification Search ............ 363/22, 363/23, 97, 133
See application file for complete search history.

(56) References Cited

U.S. PATENT DOCUMENTS

| | | | |
|---|---|---|---|
| 4,674,019 A | | 6/1987 | Martinelli |
| 5,124,619 A | * | 6/1992 | Moisin et al. ............... 315/219 |
| 5,450,305 A | * | 9/1995 | Boys et al. ................. 363/24 |
| 5,459,650 A | | 10/1995 | Noro |
| 5,877,592 A | * | 3/1999 | Hesterman et al. ......... 315/106 |
| 6,236,168 B1 | * | 5/2001 | Moisin ..................... 315/291 |
| 6,933,725 B2 | * | 8/2005 | Lim et al. .................. 324/322 |
| 2008/0211478 A1 | * | 9/2008 | Hussman et al. ........... 323/355 |

FOREIGN PATENT DOCUMENTS

| | | |
|---|---|---|
| EM | 0926926 | 6/1999 |
| GB | 1153440 | 5/1969 |
| GB | 2051432 A | 1/1981 |
| GB | 2462146 | 2/2010 |
| JP | 10174445 | 6/1998 |
| WO | 2004/105226 | 12/2004 |
| WO | WO2008141343 | 11/2008 |

OTHER PUBLICATIONS

Notification of the First Office Action in the corresponding Chinese Application No. 200680034233.7, May 12, 2010.
Examination Report in the corresponding Britain Application No. GB0802662.7, May 27, 2010.

(Continued)

*Primary Examiner* — Jessica Han
(74) *Attorney, Agent, or Firm* — Law Office of Richard F. Jaworski, PC

(57) ABSTRACT

A resonant inverter includes inductive elements (L1, L2) that allow the number of magnetic components in the inverter to be reduced. The elements (L1, L2) may be designed with a leakage inductance to eliminate the need for a large DC inductor. They may also perform the function of a current splitting transformer. The inverter switches may also be driven directly from the inverter circuit without a separate controller being required.

43 Claims, 5 Drawing Sheets

OTHER PUBLICATIONS

Hu, P.A. "Selected Resonant Controverters for IPT Power Supplies" Department of Electrical and Electronic Engineering, the University of Auckland, New Zealand Oct. 2001, pp. 49, 50, 84, 92, 178, 179.

Li, L. "Resonant Converter Power Supplies for Electric Vehicles and Solid-State Lights" Sep. 15, 2003, Department of Electrical and Electronic Engineering, the University of Auckland, pp. 18, 23, 24, 31.

Pollack, H et al. "Series Parallel load-resonant controvert for controlled-current arc welding power supply" IEE Proc. Elect. Power Appl. vol. 143, No. 3 May 1996 Section 2.1, 3.1, 3.2.

* cited by examiner

△X = 26.88us
1/△X = 37.197kHz
△Y(2) = 1.563A

RESONANT INVERTER

FIELD OF THE INVENTION

This invention relates to current-fed resonant inverters for electrical power applications to change direct current (DC) into alternating current (AC).

BACKGROUND

Inverters have numerous applications in electrical power supplies including the production of alternating current power supplies, for example, when used as an inverter to convert a DC output voltage into an AC power supply (e.g. an uninterruptible power supply). They may also be used in internal stages of DC to DC converters, induction heating, microwave generation, surface detection, medical experimentation, high frequency radio systems, inductively coupled power transfer (ICPT) systems, etc.

Figure 1:
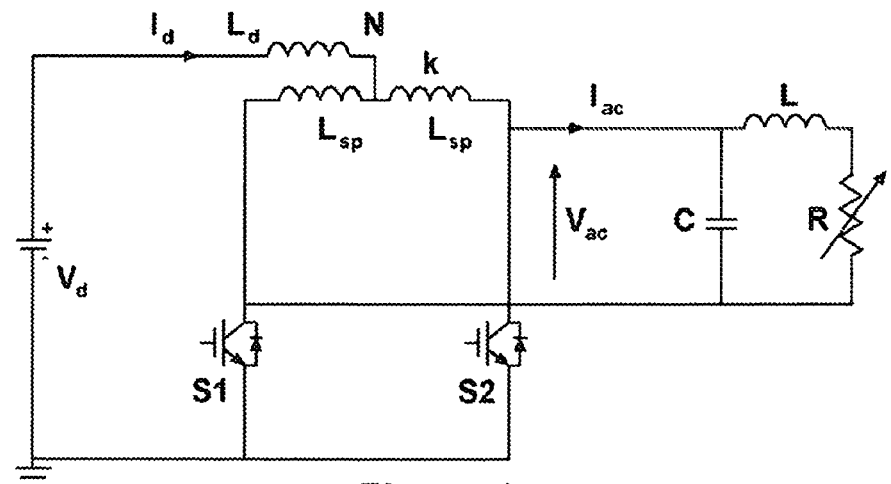

A conventional push-pull current fed resonant inverter is shown in FIG. 1. The operation of such inverters is discussed in U.S. Pat. No. 5,450,305 the contents which are incorporated herein by reference. These resonant inverters have gained much popularity due to their low switching losses and low electromagnetic interference (EMI). A fundamental problem with these inverters is that large magnetic components i.e. inductors and transformers are required. These components are physically large, heavy and expensive, so they limit opportunities to reduce size, weight and cost of these inverters.

For example, in FIG. 1 the inverter needs a "DC" or decoupling inductor Ld which decouples the inverter from the DC power source, providing a current source and allowing the voltage in the resonant circuit to oscillate freely without restraint. The circuit of FIG. 1 also has a phase splitting transformer (represented by inductors Lsp). When this inverter design is used for ICPT systems another magnetic coil or track loop L is needed to couple with secondary power pickups to achieve contactless power transfer. If the circuit is used as a DC to DC converter, then more transformers or secondary windings may be required to provide the DC power output.

The decoupling inductor Ld is required to provide a constant current source under steady state operating conditions. This inductor is usually designed to be large to overcome saturation problems. The phase splitting transformer with the two closely coupled windings Lsp is used to divide the DC current into two branches, and the switches S1 and S2 are controlled to be "on" and "off" alternately, to change the direction of the current that is injected into the resonant tank circuit which comprises the coil L and its tuning capacitor C. The resistor R represents the load supplied by the inverter, and in FIG. 1 also includes the resistance of inductor L.

An external controller (not shown) is also required in order to control the switches S1 and S2. The controller detects the resonant voltage (for example sensing voltage across tuning capacitor C) and drives the switches at zero voltage crossings (Zero Voltage Switching). These switching techniques help to reduce the switching losses and EMI. However, to do so, an extra voltage transformer or winding is usually needed to detect the zero voltage crossings across the capacitor C. The detected information is used by the controller to drive the switches S1 and S2 and special gate drive circuits are usually required. The start up of this form of inverter is particularly difficult, requiring a complex controller.

Therefore, apart from the semiconductor switches and tuning capacitors, there are many magnetic components required for the conventional push pull current fed resonant inverter.

OBJECT

It is an object of the present invention to provide an inverter, or a design methodology for an inverter, which at least obviates or minimises one or more of the foregoing disadvantages, or which will at least provide the public with a useful choice.

BRIEF SUMMARY OF THE INVENTION

In one aspect the invention consists in a resonant inverter including an input for supply of current from a DC power source, and two or more inductive elements that form part of a resonant circuit of the inverter, wherein the leakage inductance of one or both of the inductive elements substantially decouples the inverter from the power source.

The inductive elements are preferably arranged to split current received from the power source.

In another aspect the invention consists in a resonant inverter including an input for supply of current from a DC power source, a resonant circuit including two or more inductive elements and a capacitive element, the inductive elements being arranged to split current from the power source, switching means to controllably switch current from the power source into the resonant circuit, and wherein the leakage inductance of one or both of the inductive elements substantially decouples the inverter from the power source.

The switching means may comprise two switching devices operable in substantially opposite phase to alternately switch current from the power source into the inductive elements.

The inductive elements may be coupled or uncoupled, and may be single or separate windings. In a preferred embodiment the inductive elements comprise a single component. They may also be coreless.

In another aspect the invention consists in a resonant inverter including an input for supply of current from a DC power source, a resonant circuit including two or more inductive elements and a capacitive element, the inductive elements being arranged to split current from the power source, two switching devices operable to controllably switch current from the power source into the resonant circuit in substantially opposite phase to alternately switch current from the power source into the inductive elements, each switching device being driven by a signal derived from the resonant circuit.

In a preferred embodiment each switching device is provided between an inductive element and the power source, and a driving signal connection point is provided between each switching device and the corresponding inductive element, the driving signal for each switching device is derived from the driving signal connection point of the other switching device.

In a further aspect the invention consists in a resonant inverter including:

a first and a second input terminal for connection to a power source of substantially direct current electrical power;

two inductive elements each having first and second terminals, the first terminals of each of the inductors being connected to the first input terminal;

a capacitive element connected between the other terminals of the inductors, and;

a first switching means connected between the second terminal of one inductor and the second input terminal, and a second switching means connected between the second terminal of the other inductor and the second input terminal, and;

wherein the leakage inductance of one or both of the inductive elements substantially decouples the inverter from the power source.

In a further aspect the invention consists in a resonant inverter including:

a first and a second input terminal for connection to a power source of substantially direct current electrical power;

two inductive elements each having first and second terminals, the first terminals of each of the inductors being connected to the first input terminal;

a capacitive element connected between the other terminals of the inductors, and;

a first switching means connected between the second terminal of one inductor and the second input terminal, and a second switching means connected between the second terminal of the other inductor and the second input terminal, and;

each switching means is driven by a signal derived from the second inductor terminal to which that switch is not connected.

In a preferred embodiment one or more of the inductive elements comprises at least a part of a primary conductive path or track coil of an ICPT system.

In another embodiment one or more of the inductive elements comprises at least a part of an induction heating device.

The inverter may be operable over a frequency range of substantially 50 Hz-500 kHz.

In further aspect the invention consists in a resonant inverter including an input for supply of current from a DC power source, and two or more inductive elements that form part of a resonant circuit of the inverter, wherein the leakage inductance of one or both of the inductive elements substantially provides a current source.

In a further aspect the invention consists in a method of designing a resonant inverter, the method including the steps of selecting a magnetic component for a resonant circuit of the inverter which has sufficient leakage flux to substantially decouple the inverter from a DC power source.

It should be noted that various changes and modifications to the presently preferred embodiments described herein will be apparent to those skilled in the art. Such changes and modifications may be made without departing from the spirit and scope of the present invention as set forth in the accompanying claims and without diminishing its attendant advantages. It is, therefore, intended that such changes and modifications be included within the present invention.

Throughout this document the word "comprise" and variations such as "comprises" and "comprising" is intended to be interpreted in an inclusive sense.

DRAWING DESCRIPTION

Figure 2:
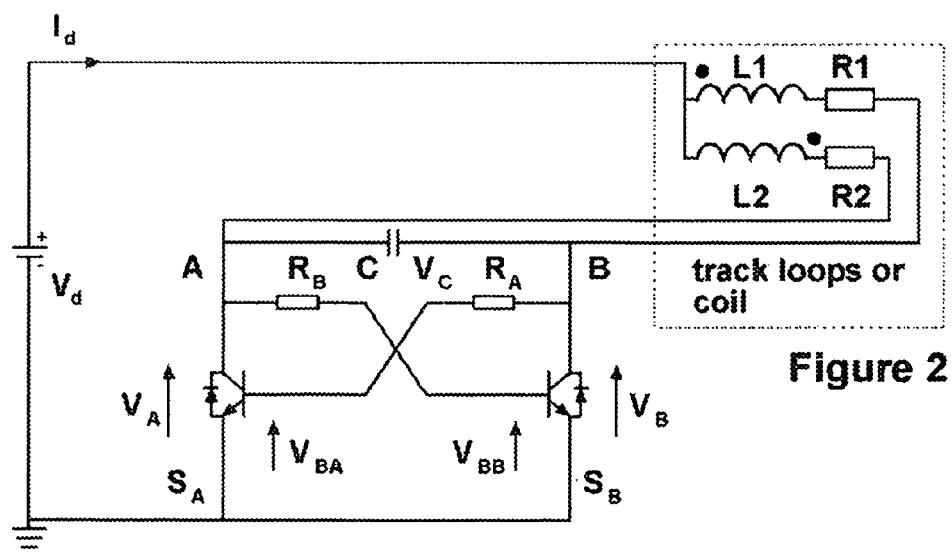
Figure 3:
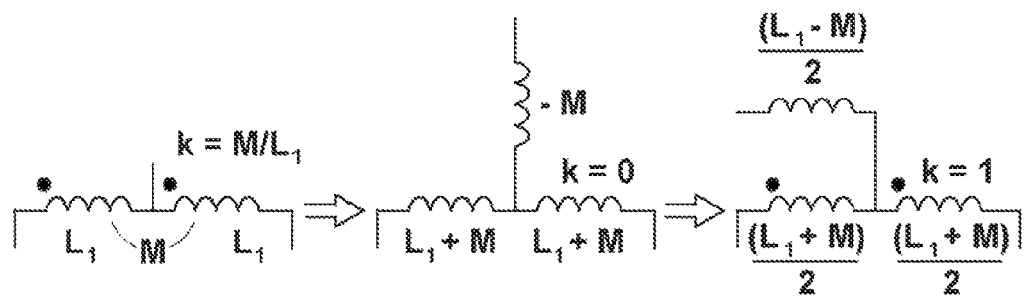
Figure 4:
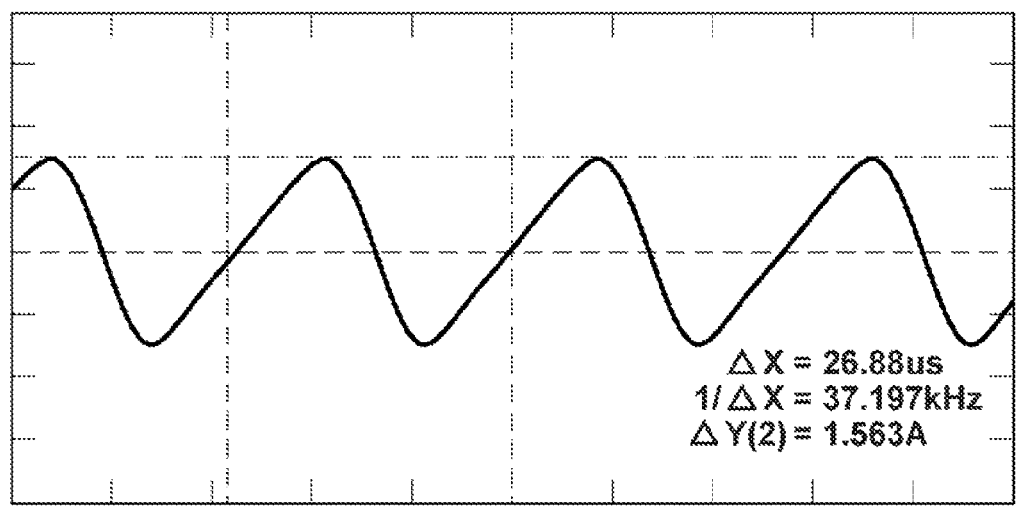

FIG. 1: is a schematic circuit diagram of a known push pull current fed resonant inverter, FIG. 2: is a circuit diagram of one embodiment an inverter according to the present invention, FIG. 3: is a diagram of equivalent circuits for windings, showing an equivalent for the magnetic components of the inverter shown in FIG. 2, FIG. 4: is a diagram of measured inductor current through inductor L1 or L2 of FIG. 2 with respect to time (each horizontal grid line representing a time period of 9.40 microseconds, and each vertical grid line represents a current of 1 Amp)

Figure 5:
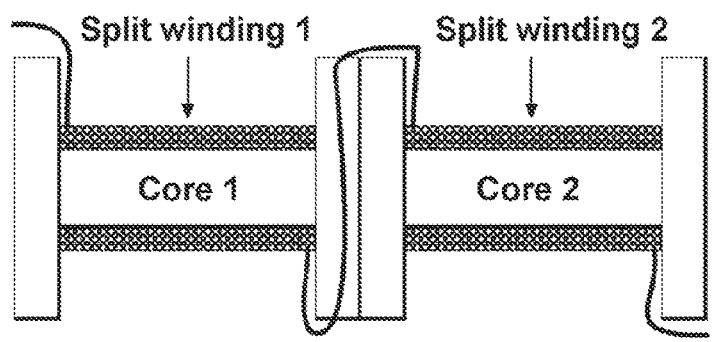

FIG. 5: is a diagrammatic elevation in partial cross section of two adjacent drum cores used to implement a split winding.

Figure 6A:
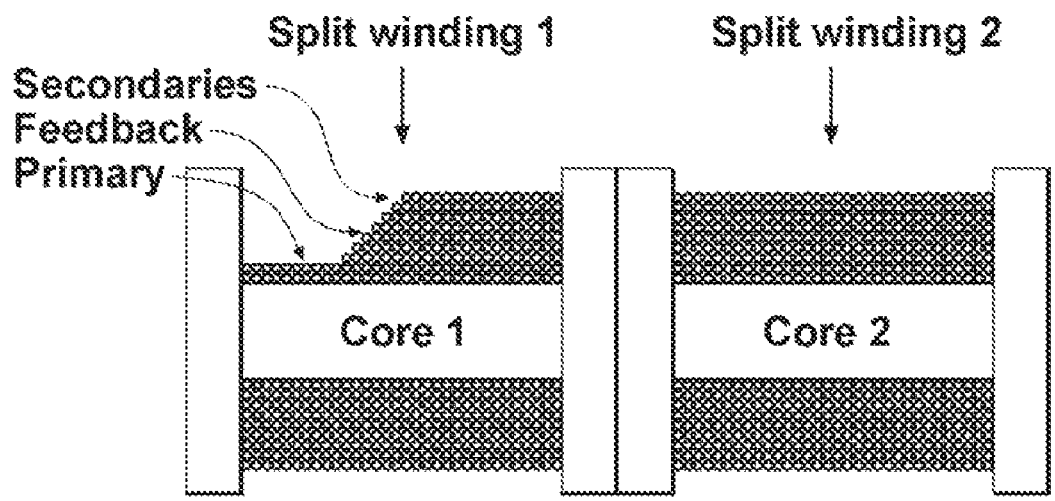

FIG. 6A: is a further diagrammatic elevation in cross section of drum cores used to form a split winding, and also used to provide additional windings for other applications such as a DC-DC converter (not shown). A feedback coil (not shown) may also been integrated inside for feedback control when necessary.

FIGS. 6b-6E show diagrammatic examples of further coil arrangements.

Figure 7:
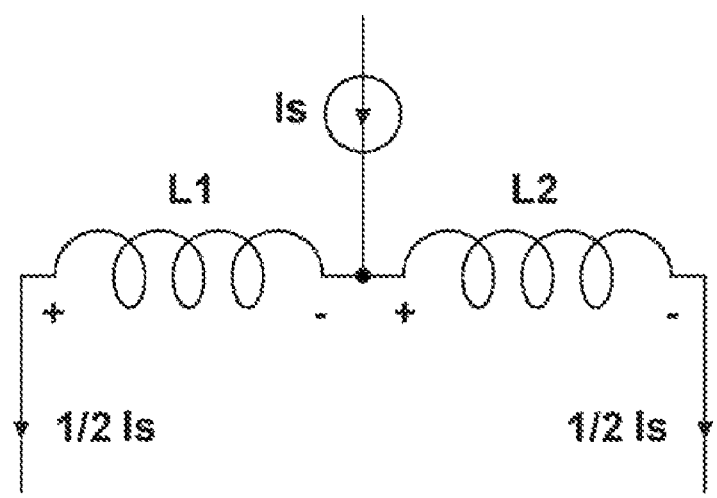
Figure 6B:
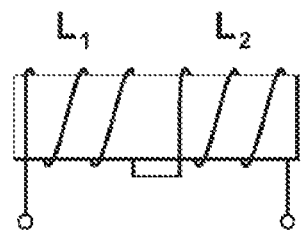
Figure 6C:
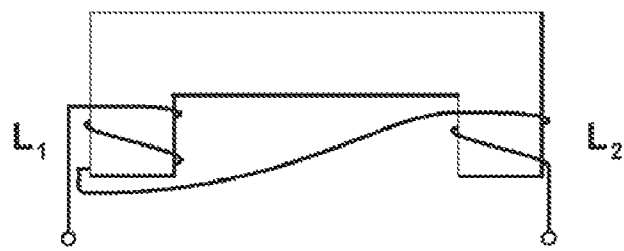
Figure 6D:
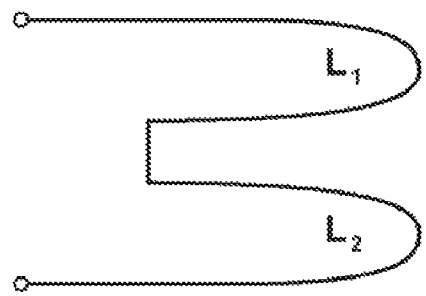
Figure 6E:
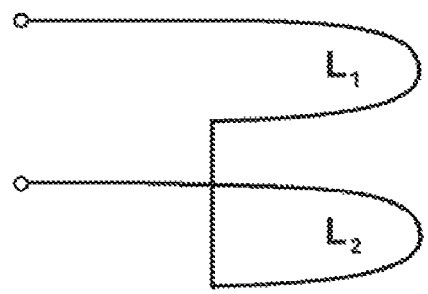
Figure 8:
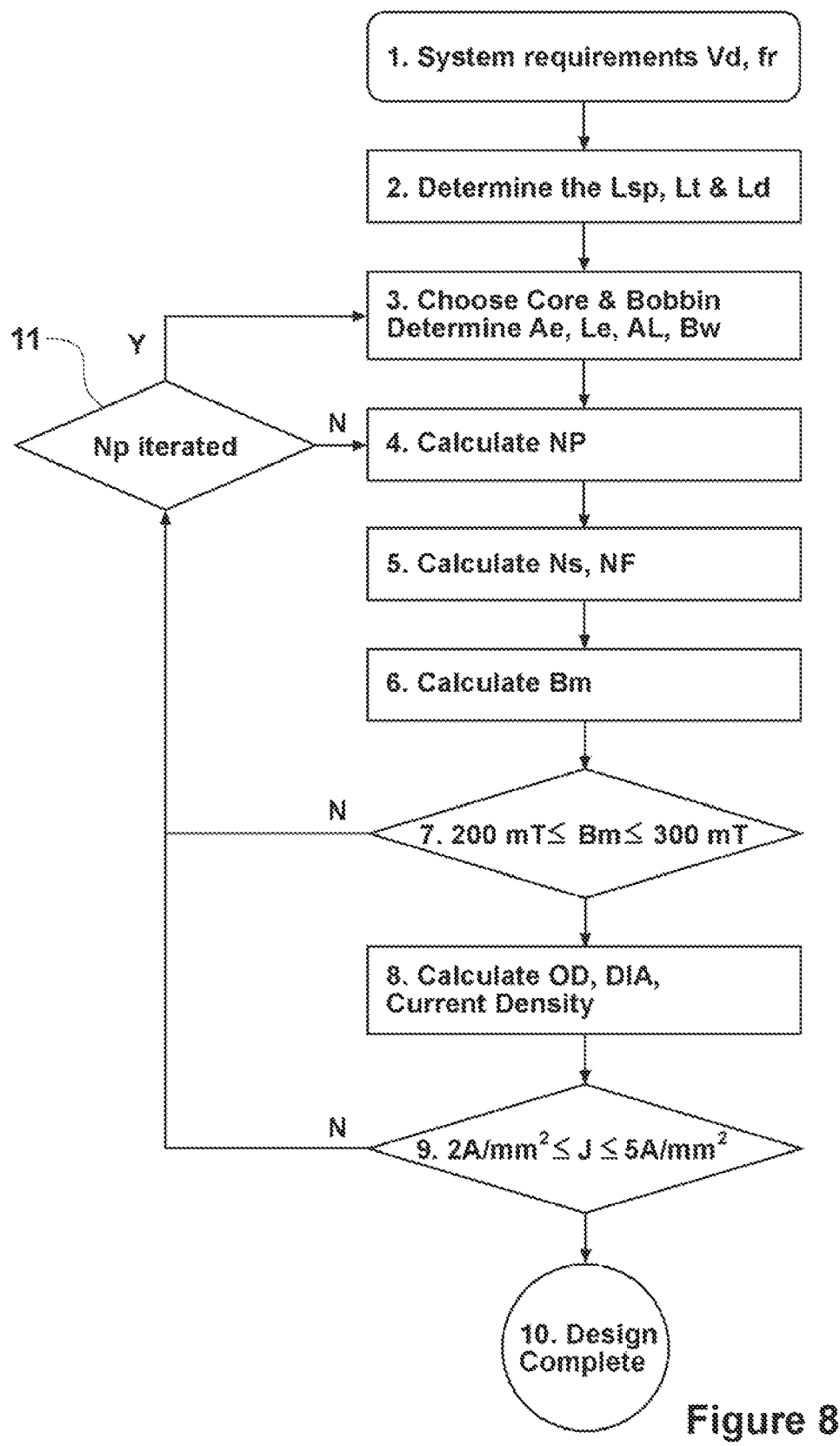

FIG. 7: is a diagram showing current flow through a split winding such as that shown in FIG. 5 or 6, FIG. 8: is a flow diagram for designing an integrated magnetic component according to an embodiment of the invention for a DC-DC inverter application.

DETAILED DESCRIPTION

Referring to FIG. 2, a new inverter design is shown. In this inverter, the bulky and expensive DC inductor Ld described with reference to FIG. 1 above, together with the splitting transformer Lsp, are completely eliminated. Two inductive elements, such as coils (which may be track loops in an ICPT system) L1 and L2 are used to replace the original resonant inductor L, splitting transformer Lsp and DC inductor Ld of the circuit of FIG. 1. Each coil L1 and L2 may comprise half of a primary conductive path for an ICPT power supply system. The inductive elements L1 and L2 may comprise a single winding or a split winding with an intermediate tap or connection. They may be positively coupled, negatively coupled, or not coupled at all. The inductance of each element does not need to be the same, although in most situations it will be preferable to keep them balanced. As will be seen from FIG. 2 the supply Vd is provided across input terminals is connected to a first terminal of each idealistic element is connected to a switch, across capacitor C. The switches are connected between the second terminal of each inductive element and the other input terminal.

The two coils L1 and L2 may or may not be coupled. In either case, their leakage inductance functions as a DC inductor to smooth the DC current Id. The current Id is divided automatically between the two branches so that no special splitting transformer is needed. Also, the total inductance of L1 and L2 serves as the resonant inductor and resonates with the tuning capacitor C. Therefore, the value of tuning capacitor C has been chosen to provide resonance when connected and paralleled with the total inductance L1 and L2. Accordingly, the circuit has a significant advantage that the coils L1 and L2 are selected such that they have multiple functions. This provides a significant benefit that the number of magnetic components is significantly reduced, which in turn reduces physical size and cost.

Referring now to FIG. 3, the design of inductors L1 and L2 may be realised by referring to the equivalent circuits shown in that figure. In particular, it can be proven that two partially coupled windings with an identical inductance L1 are equivalent to fully coupled windings with the leakage inductance of:

$$L_{lk} = \frac{L_1 - M}{2} = \frac{(1-k)}{2}L_1 \qquad (1)$$

Where M is the mutual inductance of the partially coupled windings, $L_1$ is the self inductance of each single winding and k is the coupling coefficient that is defined as:

$$k = M/L_1 \qquad (2)$$

provided the inductances of the two windings are equal. Under this situation, the total inductance of the two windings would be:

$$L_t = 2(L_1 + M) \quad (3)$$

This inductance is larger than the uncoupled sum but smaller than the fully coupled total inductance.

If the windings are not coupled at all, the mutual inductance and the coupling coefficient are zero, but the leakage inductance still exists, being half of L1, and the total inductance is 2L1.

We have simulated and practically tested the inverter shown in FIG. 2. FIG. 4 shows a typical current flowing through one of the inductors L1 or L2. The current in this example is approximately 1.56 amps at 37.2 kilohertz. The distortion shown in the waveforms relates to the DC component of the current. Because no dedicated phase splitting transformer is used, the dc current has to flow through the inductors. But it can be minimised by designing suitable inductors and coupling.

Depending on the application, the two inductive components L1 and L2 can appear in different physical forms. In the case of ICPT and induction heating, they may simply be two coupled or uncoupled coils and may be provided as a single winding with an intermediate tap (such as a centre tap) or be provided as split windings. As these coils are needed to exist naturally in such applications, no additional magnetic design is required. For other applications such as a DC-DC converter, these two coils, together with power output windings, feedback windings, etc can be integrated into one magnetic component.

Turning now to FIG. 5, an example of a practical winding design to implement the inductors L1 and L2 of FIG. 2 for a DC-DC converter application, is shown diagrammatically. The first split winding 1 can be provided on a drum core 1, and a second split winding 2 can be provided on a drum core 2. This is simply one example of a way to create windings, and should not be interpreted as being in any way limiting. The coupling between the windings on core 1 and bore 2 in FIG. 5 can be adjusted easily and additional power output windings and voltage feedback windings can also be wound together where necessary. The drum core makes it easier to keep the two sides symmetrical compared with a flat ferrite bar.

When a partially coupled phase splitting transformer such as that described with reference to FIGS. 2-5 is used in a practical current-fed resonant inverter, it has two components in terms of magnetic field: one is caused by the resonant AC voltage, and another is the DC current. Under steady state operation, the resonant AC voltage is approximately a sine wave, while the total DC current is divided equally into two windings from the central point in opposite directions.

AC Flux Density

The AC flux density is dependant on the total number of turns of the two windings, the resonant AC voltage across the windings, and the drum core size. With a sinusoidal resonant AC voltage, the peak flux density is approximately uniform in the drum core cross-sectional area, and the AC flux density can be calculated from the following equation:

$$B_{ac} = \frac{V_{rms}}{4.44 f N A_e} \quad (4)$$

Where $V_{rms}$ and f are the magnitude (in rms) and frequency of the AC voltage respectively, $A_e$ is the drum core cross-sectional area. It can be seen that the AC flux density is inversely proportional to the resonant tank frequency. Smaller size drum cores can be used at higher frequencies.

DC Flux Density

Because the DC current flowing through the two windings has the same magnitude on average but in different directions, as shown in FIG. 7, then if the windings are fully coupled, the DC flux should be cancelled completely. However for partially coupled windings, some DC flux will be cancelled but some will remain. The final magnetic field distribution will be dependant on the size & shape of the core, the DC current magnitude, the number of turns, and how the windings are distributed.

The lump magnetic flux through the core has two component lengths in the magnetic path: the air gap length $l_g$, and the length of the core $l_c$. These two components have different permeability, therefore they cannot be directly added together. The DC flux density in the core can be calculated from the following equation:

$$B_{dc} = \frac{0.4 \pi N I_{dc} 10^{-4}}{\left(l_g + \dfrac{l_c}{\mu_r}\right)}. \quad (5)$$

Where N is the number of turns, $I_{dc}$ is the direct current, and $\mu_r$ is the relative permeability.

In the air gap path, the permeability is unity, whereas in the drum core its value depends on the degree of saturation of the core. The effective length of the magnetic path is $I_g + I_c/\mu_r$, where $\mu_r$ is the relative permeability. The air gap path for the drum core is relatively large compared to $I_c/\mu_r$, making the winding inductance substantially unaffected by changes in $\mu_r$. In this case the equation of the DC flux density can be simplified as:

$$B_{dc} = \frac{0.4 \pi N I_{dc} 10^{-4}}{l_g} \quad (6)$$

As the cores have large air gaps and the magnetic field is largely distributed, equations (5) and (6) above cannot give a completely accurate solution. The actual magnetic field distribution has to be analyzed using more advanced methods. A simulation package named QUICK FIELD™ has been found sufficient to fulfill the task.

To simplify the analysis, two cylindrical cores can be used. Simulated results when the DC current flows in the same and opposite directions show that the maximum flux density is much lower when the current flows in the opposite direction. In the middle point of the core, the flux is zero due to the complete cancellation. The reduction of the maximum flux density means the core is not easily saturated, although its leakage can function exactly as a DC inductor in the current-fed resonant inverter.

Total Flux Density

The total flux is the supposition of the DC flux ($B^{dc}$) and the AC flux ($B^{ac}$). When the direct current follows in the phase splitting windings, a DC flux density is maintained in the drum core, while the AC flux density is changing with the AC current.

Therefore the maximum flux density is:

$$B_{max} = B_{ac} + B_{dc} \quad (7)$$

Considering equations (4) and (5), the total max flux density can be obtained approximately from:

$$B_{max} = \frac{V_{rms}}{4.44 f N A_e} + \frac{0.4\pi N I_{dc} 10^{-4}}{\left(l_g + \frac{l_c}{\mu_r}\right)} \quad (8)$$

Integrated Magnetics Design

An example of an integrated magnetic component is shown in FIG. 6A. The split windings 1 and 2 for the phase splitting transformer are put on two drum cores that are series connected to get the loose coupling. This component is designed to replace the multiplicity of magnetic components used in traditional DC-DC converters based on the conventional push pull current-fed topology. The phase splitting transformer and the DC inductor have been integrated as a single component, and two power output windings, as well as the voltage feedback coil for ZVS are integrated inside. Further examples are shown in FIGS. 6B-6E.

Turning now to FIG. 8, a design flow diagram shows the general steps involved in a design procedure for designing an integrated magnetic component according to the invention. The primary objective of the design procedure is to minimise the size of the component for a push pull current fed DC-DC converter having a circuit topology as show in FIG. 2. The steps are described in more detail below:

Step 1 Determine System Requirements: DC Input Vd, and Resonant Frequency fr

Vd is the input DC voltage of the push-pull current-fed resonant inverter. The input DC voltage can be high or low, depending on the application. The resonant frequency fr is mainly determined by the resonant capacitor and inductor, and the switches turned on and off at the zero cross points at approximately at this frequency which can be expressed as $$f_r = f_o \sqrt{1 - \frac{1}{Q^2}} \quad (9)$$

where $$f_o = \frac{1}{2\pi\sqrt{LC}} \quad (10)$$

and $$Q = \frac{2\pi f_o L}{R} \quad (11)$$

Note Q is the quality factor, being a defined ratio between the characteristic impedance and the resistance.

Step 2. Determine the Split winding inductance Lsp, Total Inductance Lt & Leakage Inductance Ld Lsp is the inductance of the split winding, it is proportional to the number of turns and the inductance factor $A_L$. Lt is the total inductance of the two split windings, it is normally designed to be 10 times larger than the resonant tank inductance, this is to avoid its effect on the resonant tank voltage, current and frequency.

The leakage inductance Ld is used to eliminate the DC choke to form the current source at the input dc voltage. It can be designed by adjusting the coupling coefficient (k) between those two split windings as is expressed in Eqn (1).

Step 3 Choose Core & Bobbin, Determine Ae, Le, $A_L$ and Bw from Core and Bobbin Catalog Select the drum core, determine the parameters for the construction of the integrated component, including the primary inductance Lp; number of turns for the primary Np, secondary Ns and the feedback $N_F$, the primary winding OD (Outside Diameter) and the secondary winding ODs, bare conductor diameter for the primary DIA and secondary DIAs. Once a drum core is selected, the drum core parameters Ae, Magnetic path length Le, $A_L$ and the bobbin parameters such as its width Bw can be found from the manufacturer's handbook.

Step 4 Calculate Np

The number of turns in the primary Np depends on the inductance of the split windings required, from the given inductance factor $A_L$ and the split winding inductance in step 2, the number of the turns in a single split winding can be calculated using:

$$Nsp = \sqrt{\frac{Lsp}{A_L}} \quad (12)$$

And the number of the turns of the primary is:

$$Np = 2Nsp \quad (13)$$

Step 5 Calculate Ns and NE

The secondary number of turns Ns is determined by the primary number of turns Np and the ratio between the secondary voltage Vs and primary voltage Vp, it can be calculated using:

$$Ns = Np \frac{Vs}{Vp} \quad (14)$$

Where Vp=πVd is determined by the push-pull current-fed inverter topology, Vs is the secondary voltage. The equation above ignores the reflected voltage from the secondary. Similarly, the number of the turns of the feedback winding $N_F$ can be derived as:

$$N_F = Np \frac{V_F}{Vp} \quad (15)$$

Where $V_F$ is the feedback voltage whose value is determined by the requirement of the ZVS controller.

Step 6 Calculate the Bmax.

Another critical parameter is the maximum flux density Bmax in the drum core, it can be roughly calculated using equation (8).

Step 7 Check Bmax

If Bmax is greater than 0.3 T, which is a typical maximum flux density limit for many ferrite cores, either the core cross sectional area (drum core) or Np must be increased to bring it down to the 0.2 T to 0.3 T range, as shown by iteration step 11. On the other hand, if Bmax is less than 0.2 T, a smaller drum core can be used as shown by iteration step 11.

Step 8 Calculate the OD, DIA and the Current Density

From the selected drum core size, it is possible to determine the outside diameter OD of the primary & secondary wire in mm that can fit into the bobbin, but the OD of the feedback winding has never been a problem, because the feedback winding carries very little current. The outside diameter OD of the primary and secondary can be calculated using (6-7):

$$OD = \frac{B_w L_N}{N} \quad (16)$$

Where N is the number of turns of the primary or secondary, Bw is the bobbin width without margin in mm, and $L_N$ is the number of winding layers.

After the closest standard wire gauge to the calculated diameter is selected, the bare conductor diameter DIA of this wire gauge can be found using the information from a wire table. The next step is to calculate the current density to make sure the conductor size is sufficient for the maximum rms current using (9-10):

$$J = \frac{I_{rms}}{DIA^2 \frac{\pi}{4}} \quad (17)$$

Where J is the current density in A/mm², Irms is the rms current in amps, DIA is the bare conductor diameter in mm.
Step 9 Check the Current Density The current density for designing the phase splitting transformer can go up to 5 A/mm², which is determined by the maximum thermal rating of windings under normal heat dissipation conditions. If the current density J is higher than 5 A/mm², a larger wire gauge is need to handle the current. This could be adding more layers if more winding area is allowed, or by using a larger drum core as shown by iteration step 11. On the other hand, if the current density is lower than 2 A/mm², which is far below the thermal limit, a smaller drum core or larger Np could be used as shown by iteration step 11.
Step 10 Complete the Design for Practical Implementation Following the step-by-step procedure, the design of an integrated magnetic component for a DC-DC converter is completed and it is ready for practical implementation and testing.

The invention allows magnetic components in push pull inverter topologies to be integrated, providing significant benefits.

From the foregoing it will be seen that two inductive elements (possibly in the form of two coils) are used to replace the DC inductor and phase splitting transformer used in conventional push-pull inverters, making the inverter much cheaper and lighter. In many applications such as induction heating, inductive power transfer, etc, the coils need to exist naturally. Embodiments of the new inverter utilise its magnetic field advantageously not only for power transfer but also for internal circuit operation. This makes the inverter completely coreless if desired.

The inverter can drive the two inductive elements at the same time. They can be coupled or not coupled in principle, therefore physically they can be one coil or two independent coils. When they are used separately, for ICPT systems, the total length of the track coils doubles.

As can be seen from the embodiment of FIG. 2, it is possible to run the inverter without using any external controllers and associated auxiliary power supplies to control the semiconductor switches. All the power and signals required to drive the switches may be generated internally. As can be seen from FIG. 2, a connection point (in that example the collector of each transistor switching device) is used to derive a driving signal for the opposite switching device. Therefore the cost is further reduced. Also, the element count reduces and the reliability of the inverter improves.

The design of the magnetic components i.e. the inductive elements in preferred embodiments is such that the semiconductor switching devices are pushed into switch mode, and also achieving zero voltage switching so that the EMI and switching losses are minimized. A controller may still be used with embodiments of the present invention if required and any such controller may be designed to achieve other functions such as frequency or magnitude variation.

Almost all types of semiconductor switches can be used in embodiments of the invention, including BJTs (Bipolar transistors), MOSFETS, IGBTs, etc. A small capacitor can be connected in parallel with the base resistors RA and RB in FIG. 2 to speed up the base/gate drive. A single or Darlington transistor configuration can be used to form equivalent variable resistors to replace resistors RA and RB. A simple zener diode can be connected at the gate of each switch to limit the maximum voltage if MOSFETs or IGBTs are employed. Also a current limiting and voltage stabilization circuit can be added to improve the base/gate drive for high voltage applications.

Due to the natural base/gate voltage building up process, the circuit as shown in the FIG. 2 embodiment can automatically start up without any voltage of current overshoots. No start up control is required and the operation of the circuit is very easy.

Inverters are basic building blocks for many modern power inverters. This new inverter can be used in various applications where high frequency voltage or current generations are required. These applications include but not limited to inductively coupled contactless power transfer, induction heating, DC-DC converters, uninterruptible power supplies. The output of the convert can be connected to lumped or extended coils, transformer windings etc.

The invention claimed is:

1. A current fed resonant inverter comprising an input for supply of current from a DC power source, and two or more inductive elements that form part of a resonant circuit of the inverter, wherein leakage inductance of one or both of the inductive elements provides a current source to the resonant circuit and substantially decouples the resonant circuit from the power source.

2. A current fed resonant inverter as claimed in claim 1 wherein the inductive elements are arranged to split current received from the power source.

3. A current fed resonant inverter as claimed in claim 1 wherein one or more of the inductive elements comprises at least a part of a primary conductive path or track coil of an inductively coupled power transfer system.

4. A current fed resonant inverter as claimed in claim 1 wherein one or more of the inductive elements comprises at least a part of an induction heating device.

5. A current fed resonant inverter as claimed in claim 1 wherein the inverter is operable in a frequency range of substantially 50 Hz-500 kHz.

6. A current fed resonant inverter comprising an input for supply of current from a DC power source, a resonant circuit including two or more inductive elements and a capacitive element, the inductive elements being arranged to split current from the power source, switching means to controllable switch current from the power source into the resonant circuit, and wherein leakage inductance of one or both of the inductive elements provides a current source to the resonant circuit and substantially decouples the resonant circuit from the power source.

7. A current fed resonant inverter as claimed in claim 6 wherein the switching means comprising two switching devices operable in substantially opposite phase to alternately switch current from the power source into the inductive elements.

8. A current fed resonant inverter as claimed in claim 6 wherein the inductive elements are coupled.

9. A current fed resonant inverter as claimed in claim 6 wherein the inductive elements are not coupled.

10. A current fed resonant inverter as claimed in claim 6 wherein the inductive elements comprise a single winding.

11. A current fed resonant inverter as claimed in claim 6 wherein the inductive elements comprise a single component.

12. A current fed resonant inverter as claimed in claim 6 wherein the inductive elements are coreless.

13. A current fed resonant inverter as claimed in claim 6 wherein one or more of the inductive elements comprises at least a part of a primary conductive path or track coil of an ICPT system.

14. A current fed resonant inverter as claimed in claim 6 wherein one or more of the inductive elements comprises at least a part of an induction heating device.

15. A current fed resonant inverter as claimed in claim 6 wherein the inverter is operable in a frequency range of substantially 50 Hz-500 kHz.

16. A current fed resonant inverter comprising an input for supply of current from a DC power source, a resonant circuit including two or more inductive elements and a capacitive element, the inductive elements being arranged to split current from the power source, two switching devices operable to controllably switch current from the power source into the resonant circuit in substantially opposite phase to alternately switch current from the power source into the inductive elements, each switching device being driven by a signal derived from the resonant circuit, wherein the leakage inductance of the inductive elements provides a current source to the resonant circuit and substantially decouples the resonant circuit from the power source and wherein the inductive elements being arranged to split current from the power source.

17. A current fed resonant inverter as claimed in claim 16 wherein each switching device is provided between an inductive element and the power source, and a driving signal connection point is provided between each switching device and the corresponding inductive element, the driving signal for each switching device is derived from the driving signal connection point of the other switching device.

18. A current fed resonant inverter as claimed in claim 16 wherein the inductive elements are coupled.

19. A current fed resonant inverter as claimed in claim 16 wherein the inductive elements are not coupled.

20. A current fed resonant inverter as claimed in claim 16 wherein the inductive elements comprise a single winding.

21. A current fed resonant inverter as claimed in claim 16 wherein the inductive elements comprise a single component.

22. A current fed resonant inverter as claimed in claim 16 wherein the inductive elements are coreless.

23. A current fed resonant inverter as claimed in claim 16 wherein one or more of the inductive elements comprises at least a part of an induction heating device.

24. A current fed resonant inverter as claimed in claim 16 wherein the inverter is operable in a frequency range of substantially 50 Hz-500 kHz.

25. A current fed resonant inverter comprising:
a first and a second input terminal for connection to a power source of substantially direct current electrical power;
two inductive elements each having first and second terminals, the first terminals of each of the inductors being connected to the first input terminal;
a capacitive element connected between the other terminals of the inductors, and;
a first switching means connected between the second terminal of one inductor and the second input terminal, and a second switching means connected between the second terminal of the other inductor and the second input terminal, and;
wherein leakage inductance of one or both of the inductive elements provides a current source to the resonant circuit and substantially decouples the resonant circuit from the power source.

26. A current fed resonant inverter as claimed in claim 25 wherein the inductive elements are coupled.

27. A current fed resonant inverter as claimed in claim 25 wherein the inductive elements are not coupled.

28. A current fed resonant inverter as claimed in claim 25 wherein the inductive elements comprise a single winding.

29. A current fed resonant inverter as claimed in claim 25 wherein the inductive elements comprise a single component.

30. A current fed resonant inverter as claimed in claim 25 wherein the inductive elements are coreless.

31. A current fed resonant inverter as claimed in claim 25 wherein one or more of the inductive elements comprises at least a part of an induction heating device.

32. A current fed resonant inverter as claimed in claim 25 wherein the inverter is operable in a frequency range of substantially 50 Hz-500 kHz.

33. A current fed resonant inverter comprising:
a first and a second input terminal for connection to a power source of substantially direct current electrical power;
two inductive elements each having first and second terminals, the first terminals of each of the inductors being connected to the first input terminal;
a capacitive element connected between the other terminals of the inductor, and;
a first switching means connected between the second terminal of one inductor and the second input terminal, and a second switching means connected between the second terminal of the other inductor and the second input terminal, and;
each switching means is driven by a signal derived from the second inductor terminal to which that switch is not connected, and
wherein the leakage inductance of inductive elements provides a current source to the resonant circuit and substantially decouples the resonant circuit from the power source.

34. A current fed resonant inverter as claimed in claim 33 wherein the inductive elements are coupled.

35. A current fed resonant inverter as claimed in claim 33 wherein the inductive elements are not coupled.

36. A current fed resonant inverter as claimed in claim 33 wherein the inductive elements comprise a single winding.

37. A current fed resonant inverter as claimed in claim 33 wherein the inductive elements comprise a single component.

38. A current fed resonant inverter as claimed in claim 16 wherein one or more of the inductive elements comprises at least a part of a primary conductive path or track coil of an ICPT system.

39. A current fed resonant inverter as claimed in claim 25 wherein on or more of the inductive elements comprises at least a part of a primary conductive path or track coil of an ICPT system.

40. A current fed resonant inverter as claimed in claim 33 wherein one or more of the inductive elements comprises at least a part of a primary conductive path or track coil of an ICPT system.

41. A current fed resonant inverter as claimed in claim 33 wherein one or more of the inductive elements comprises at least a part of an induction heating device.

42. A current fed resonant inverter as claimed in claim 33 wherein the inverter is operable in a frequency range of substantially 50 Hz-500 kHz.

43. A method of designing a current fed resonant inverter, the method comprising the steps of selecting a magnetic component for a resonant circuit of the inverter which has sufficient leakage flux to provide a current source to the resonant circuit and substantially decouple the resonant circuit from a DC power source.

* * * * *